US005519983A

United States Patent [19]

Moen

[11] Patent Number: 5,519,983
[45] Date of Patent: May 28, 1996

[54] SHRINK WRAP PACKAGING SYSTEM WITH AN ULTRASONIC SIDE SEALER

[75] Inventor: Ricky E. Moen, Port Washington, Wis.

[73] Assignee: Conflex Packaging, Inc., Milwaukee, Wis.

[21] Appl. No.: 146,984

[22] Filed: Nov. 2, 1993

[51] Int. Cl.⁶ .............................. B65B 9/06; B65B 53/02
[52] U.S. Cl. .................... 53/442; 53/373.5; 53/459; 53/557; 53/568; 53/DIG. 2
[58] Field of Search ................ 53/373.4, 374.3, 53/373.5, 442, 459, 568, 557, DIG. 2

[56] References Cited

U.S. PATENT DOCUMENTS

| | | |
|---|---|---|
| 3,879,239 | 4/1975 | Rager et al. . |
| 4,219,988 | 9/1980 | Shanklin et al. ................ 53/568 X |
| 4,343,864 | 8/1982 | Berejka . |
| 4,433,527 | 2/1984 | Ramsey et al. . |
| 4,858,416 | 8/1989 | Monaghan ................ 53/373.5 X |
| 4,924,659 | 5/1990 | Watanabe . |
| 4,939,889 | 7/1990 | Watanabe . |
| 4,954,191 | 9/1990 | Delespaul et al. . |
| 4,970,846 | 11/1990 | Leino ................ 53/373.4 X |
| 5,050,368 | 9/1991 | Noh ................ 53/557 X |
| 5,074,415 | 12/1991 | Kaplan et al. . |

FOREIGN PATENT DOCUMENTS 405085526  4/1993  Japan ................ 53/DIG. 2

OTHER PUBLICATIONS

Branson Ultrasonics Corporation Data Sheet PW-31; "Model F-10 Ultrasonic Slitter", 1981.

Primary Examiner—Linda Johnson
Attorney, Agent, or Firm—Andrus, Sceales, Starke & Sawall

[57] ABSTRACT

A shrink wrap packaging system has an ultrasonic side sealer. The ultrasonic side sealer contemporaneously slits and welds together at least two separate layers of shrink wrap film. The ultrasonic side sealer is useful in in-line shrink wrap packaging equipment in which a continuous side seal or weld is required to wrap shrink wrap completely around one or more packaged items.

25 Claims, 4 Drawing Sheets

5,519,983

SHRINK WRAP PACKAGING SYSTEM WITH AN ULTRASONIC SIDE SEALER

FIELD OF THE INVENTION

The invention relates to a shrink wrap packaging system having an ultrasonic side sealer. In particular, the invention relates to ultrasonic side sealing in which at least two separate layers of shrink wrap film can be contemporaneously slit and welded together. The invention is especially useful on in-line shrink wrap packaging equipment in which a continuous side seal or weld is required to wrap shrink wrap completely around one or more packaged items.

BACKGROUND OF THE INVENTION

In a typical in-line shrink wrap packaging machine, one or more unpackaged items are moved towards a shrink wrap cutting and sealing area by an in-feed conveyor. As the item or items are moved into the shrink wrap cutting and sealing area, the item or items are surrounded by center-folded shrink wrap film that has been partially unfolded so that the item or items can be conveyed into the partially unfolded center-folded film. When the item or items have been conveyed into the partially unfolded center-folded film, the item or items exit the in-feed conveyor and are transferred to an exit conveyor. It is typical for the exit conveyor to continue conveying the item or items until the item or items are moved to the shrink wrap cutting and sealing area beyond a designated cross-sealing location. At that point, it is typical to stop forward movement of the exit conveyor, and use a hot knife system to cut the layers of the shrink wrap film and contemporaneously weld or seal the layers of film together at the cut so that the shrink wrap film is wrapped around the item or items.

After the shrink wrap film has been cut and sealed the exit conveyor is again activated, and the item or items are moved into a shrink tunnel or oven. After each group of one or more items is heated in the shrink tunnel, the shrink wrap tightens around the item or items so that the item or items are securely wrapped.

The cutting and sealing is repeated on consecutive groups of one or more items as the groups are conveyed through the system. The cut and seal across the film in between consecutive groups of one or more items being separately wrapped is a cross seal. The cut and seal along the length of the film on the side of the group of one or more items opposite from the center fold is a side seal. The selvage film that is wasted beyond the side seal is disposed of by winding on selvage rollers.

An L-shaped jaw-type hot knife systems can be used to contemporaneously cross-seal and side seal when the center-folded film is stopped. In a jaw-type system, the L-shaped hot knife is normally coated with Teflon, so that melted shrink wrap film will not stick to the knife. When the group of one or more items to be wrapped has been moved in the cutting and sealing area beyond the designated cross-sealing location, forward movement is stopped and the L-shaped hot knife presses down on a corresponding L-shaped seal pad, and cuts and seals the shrink wrap film. The L-shaped seal pad typically has a flat top surface that is covered with Teflon coated tape.

The dimensions of L-shaped hot knives must be customized to the size of the items being wrapped. It is important that a Teflon coated hot knife be extremely straight and without nicks. If the knife is improperly adjusted, warped, or has nicks, the shrink wrap will not seal properly. For instance, a nick in the knife will created a hole in the seal. Likewise, a warped or improperly adjusted knife will create an incomplete seal. When long items are being wrapped, these problems are exacerbated. In addition, long items require an extremely long side-sealing areas and an extremely long side-sealing hot knife. Such machines typically must be custom made.

Efforts have been made with rotary-type, hot knife side sealing systems that can cut and side seal shrink wrap film without stopping the forward movement of the film. Such rotary-type, hot knife side sealing systems typically have a circular Teflon coated knife mounted for rotation. Such systems are not well suited for high speed applications because of insufficient contact time for proper welding with the circular rotating knife.

Hot drag wire side sealers (e.g. film is dragged between two hot wires) can also be used, but such systems require high maintenance and produce inconsistent seals.

SUMMARY OF THE INVENTION

The present invention overcomes many of the above described problems by using an ultrasonic side sealer. In one aspect, the invention is a shrink wrap packaging system having a shrink wrap film holder and a shrink wrap film unwinder that unwinds two layers of shrink wrap film and moves the layers of film in a forward direction. The system has an infeed conveyor that moves a group of one or more items also in the forward direction and in between the layers of the shrink wrap film in such a manner that an overhanging portion of each layer extends sideward beyond the group of one or more items. The system also has a side sealer that slits the two layers of shrink wrap film in the overhanging portion and seals together the two layers of shrink wrap film where the two layers are slit. The side sealer has an ultrasonic horn with a tip from which ultrasonic energy can be transmitted and a disc that can be pressed against the tip of the ultrasonic horn. The layers of shrink wrap film are fed between the disc and the tip of the ultrasonic horn, and in this manner are slit and welded together.

The system can also have a cross sealer, such as a Teflon coated hot knife, that can cross slit and cross seal the layers of shrink wrap film between consecutive groups of one or more items being separately wrapped.

The system can also have an exit conveyor that is separate from the infeed conveyor. It is preferred that the exit conveyor be located downstream of the cross sealer, if a cross sealer is present. It is preferred in such a system that the infeed conveyor and the exit conveyor be controlled by separate motors so that they can be stopped and started at different times depending on the location of the items being packaged. An electric photo eye in combination with a timer can be used to detect the location of the items being packaged to coordinate the starting and stopping of the conveyors. It is also preferred that speed control for the infeed and the exit conveyors should be variable so that films requiring different exposure times to the ultrasonic energy for proper welding can be used on the same system. It is preferred that the speed control for the infeed conveyor motor be the same as for the exit conveyor to insure that both conveyors operate at the same speed, although they may be stacked and stopped at different times.

In another aspect, the invention is a method of slitting and sealing shrink wrap film around a group of one or more items. In the method, the group of one or more items is put between two layers of shrink wrap film so that an overhanging portion of each layer extends beyond a designated side of the group. The film and the group of one or more items therein are contemporaneously moved in the forward direction, the layers of film are slit in the overhanging portion extending beyond the designated side of the group and are welded together at the slit. The slitting and sealing together is accomplished by squeezing together the layers of film at a contact location where the side seal is being formed and applying ultrasonic energy at the contact location when the layers of film are being squeezed together.

It is an object of the present invention to provide a side sealer that can side seal long items without significant setup time, or customized equipment.

It is another object of the present invention to provide a side sealer that does not have many moving parts.

It is another object of the present invention to provide a side sealer that does not create a significant amount of heat.

It is yet another object of the present invention to provide a side sealer that can create a consistent side seal without significant holes.

DETAILED DESCRIPTION OF THE PREFERRED EMBODIMENTS

Figure 2:
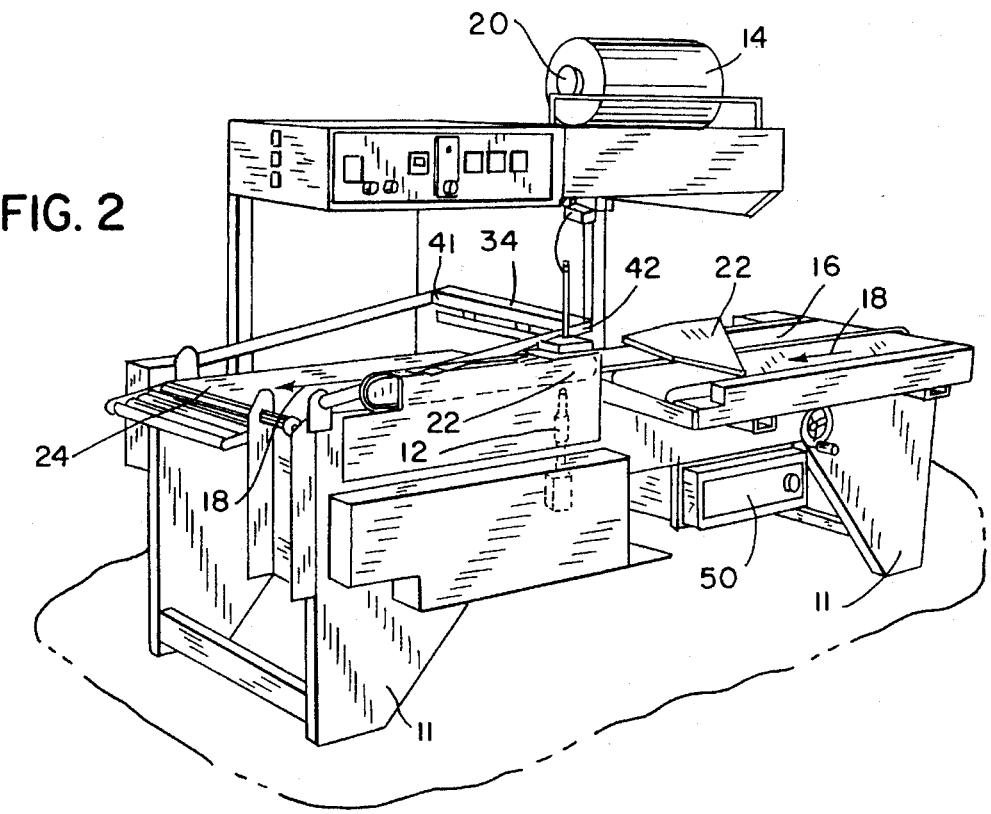
FIG. 2 is a perspective view of a shrink wrap packaging machine in accordance with the present invention.

FIG. 2 shows a shrink wrap film packaging system 10 having an ultrasonic horn 12 for side sealing center-folded shrink film 14 in accordance with the present invention. The system 10 is built on a frame 11. The system 10 has an infeed conveyor 16 that moves one or more items in a forward direction (i.e. in the direction of arrows 18). During operation of the system 10, the center-folded shrink wrap film 14 is unwound from a shrink wrap holder 20 and is inverted and opened by a film inverting head 22. The shrink wrap film 14 is then pulled in the direction of arrows 18 by a shrink wrap film guide 22. As the infeed conveyor 16 moves the group of one or more items to be packaged in the forward direction (i.e. in the direction of arrows 18), the group of one or more items is conveyed in between a lower layer of the shrink warp film and an upper layer of the shrink wrap film. The group of one or more items to be packaged is then transferred to an exit conveyor 24 that is at essentially the same height as the input conveyor 16. The exit conveyor 24 also conveys the group of one or more items in the forward direction (i.e. the direction of arrows 18). When the group of one or more items to be packaged has been transferred completely onto the exit conveyor 24, the exit conveyor 24 conveys the group for a determined distance, until the exit conveyor 24 is stopped.

Figure 1:
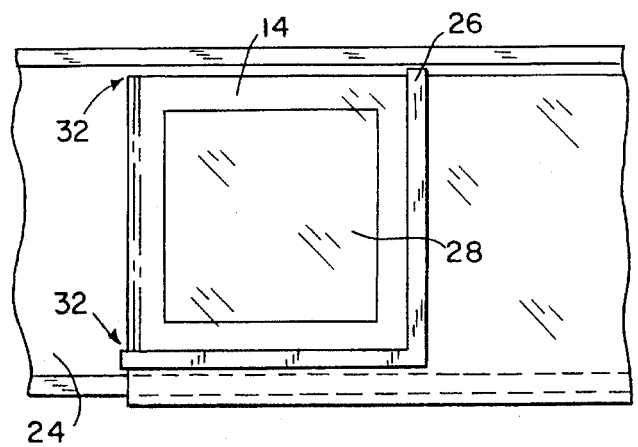
FIG. 1 is a top view of a prior art cross and side sealing system.

FIG. 1 shows a prior art system using an L-shaped hot knife 26 that slits and seals shrink wrap 14 around a group of one or more items 28. Systems using L-shaped hot knife 26 are old in the art. In general, such systems have a hot Teflon coated knife 26 that is pressed down onto a Teflon coated seal pad (not shown), when the exit conveyor 24 is stopped. In this manner, the two layers of shrink wrap 14 are cross cut and sealed between consecutive groups of one or more items 28, and are also contemporaneously side sealed on the edge 30 opposite the center-fold 32 of the shrink wrap film 14. After the shrink wrap film 14 is cut and sealed around the group of one or more items 28, the hot knife 26 is raised, the seal base is lowered, and the exit conveyor 24 moves the group of one or more items 28 in the forward direction normally to a shrink tunnel or oven (not shown).

The present invention does not need to use an L-shaped hot knife 26 as shown in FIG. 1. Rather, the present invention can use a straight hot knife 34 to cross seal, and an ultrasonic horn 12 to side seal.

Figure 3:
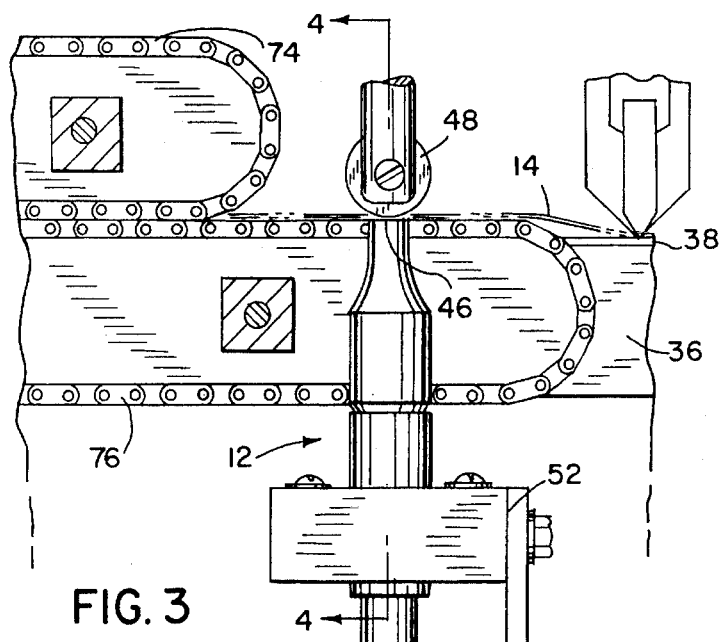
FIG. 3 is a detailed view of a side sealer in accordance with the present invention.

Referring to FIG. 3, the straight hot knife 34 that can form the cross seal in the present invention is preferably located between the infeed conveyor 16 and the exit conveyor 24. When the exit conveyor 24 stops and forward movement of the shrink wrap film 14 and the items 28 being wrapped has been stopped, the Teflon coated hot knife 34 presses down on a seal pad 36.

Figure 9:
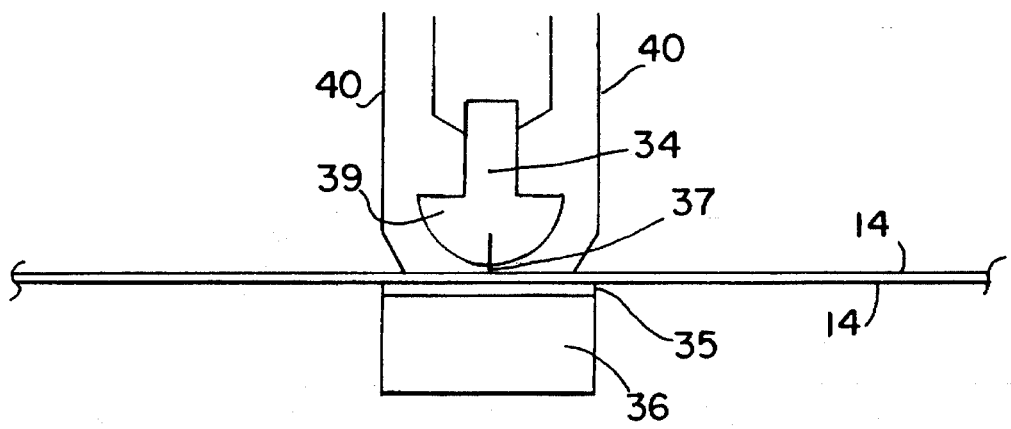
FIG. 9 is a schematic view of a cross sealer that can be used in accordance with the present invention.

Referring to FIG. 9, when using polyvinyl chloride films the preferred hot knife 34 is a mushroom head hot knife. Briefly, the hot knife 34 has a sharp blade 37 that presses down on the seal pad 36 to cross cut the layers of film 14, and a mushroom head 39 for welding together the layers 14 to form the cross seals. When using other types of films 14, a standard one piece hot knife 34 should be used.

In order to cross cut and seal, the hot knife 34 moves downward and the seal pad 36 moves upward so that knife 34 presses the layers of film 14 against the seal pad 36. Two spring loaded shrouds 40 hold the layers of film 14 on the seal pad 36. It is preferred that the top surface of the seal pad 36 be padded to 90 durometer. It is useful to cover the top surface with Teflon tape. When using a mushroom head hot knife 34, the seal pad 36 preferably has a top layer of felt 35.

It is preferred that the hot knife 34 be held against the seal pad 36 for about 0.4 seconds (the total time for the hot knife 34 jaws to close, cross seal, and open is about 1 second). When cross sealing PVC film, it is preferred that the hot knife 34 be heated to 180° C. When cross sealing polypropylene film, it is preferred that the hot knife 34 be heated to 220° C. When cross sealing other types of polyolefins, it is preferred that the hot knife be heated to 220°–240° C. The above temperatures and exposure times are exemplary, and, it is believed that temperatures and exposure times consistent with what is known in the art for prior art L-shaped hot knives as is shown in FIG. 1 should be used.

The hot knife 34 cross seals the shrink wrap film 14 from the center-fold 32 of the film to the end 42 of the knife 34 that terminates at or beyond the position of the side seal. That is, the end 42 of the knife 34 extends in the transverse direction away from the center-fold 32 to a position equal to or slightly beyond than the position of the side seal. It is important that the knife 34 not extend the entire width of the shrink wrap 14 so that the shrink wrap guide 22 can continue to pull on the selvage portion 44 of the shrink wrap 14.

The present invention also contemplates using other types of cross sealer systems than the jaw-type hot knife cross sealer described above. For example, a reciprocating hot knife system can be used so forward movement does not need to be stopped in order to cross seal. A rotary-type cross sealer could also be used for the same purpose. There are several types of cross sealers, and the invention contemplates using the side sealer described hereinafter with any of these cross sealers.

Figure 4:
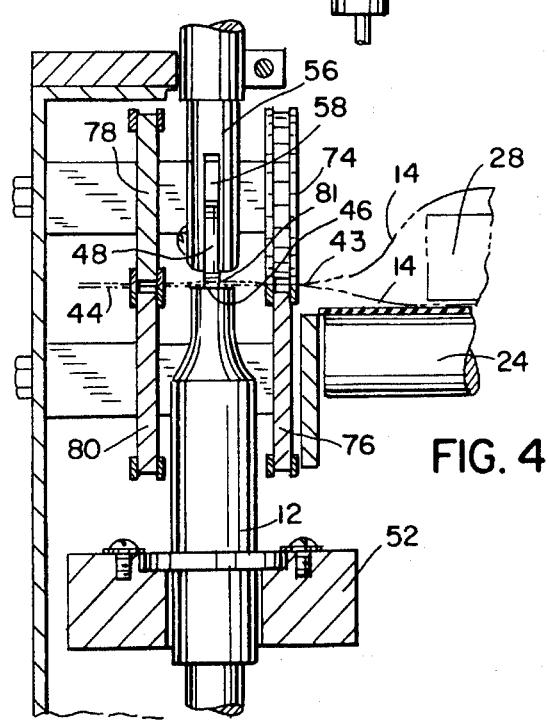
FIG. 4 is a view taken along line 4—4 of FIG. 3.

Referring now to FIG. 4, a side seal is formed in an overhanging portion 43 of the shrink wrap film 14 by squeezing the two layers of shrink wrap 14 at a contact location that is in between a tip 46 of the ultrasonic horn 12 and an edge 81 of a disc 48 as the film 14 is moved in the forward direction through the contact location. As the layers of shrink wrap film 14 are being squeezed together, ultrasonic energy is transmitted into the contact location to slit and side seal the film 14. It is believed that the ultrasonic energy transmitted from the tip 46 of the horn 12 creates heat from friction between the tip 46 and the disc edge 81, and that this heat causes slitting and welding the film as the film is squeezed and moved through the contact location. Both the horn 12 and the disc 48 are mounted to the frame 11. The ultrasonic horn 12 is mounted to the frame 11 using a bracket 52. The tip 46 of the horn 12 is normally located slightly above the height of the exit conveyor 24. With tall packages 28, it is useful to adjust the height of the tip 46 of the horn 12 to achieve a side seal at a center height (i.e. a center seal).

The preferred ultrasonic horn is a 40 kilohertz ultrasonic horn. The model F10 Ultrasonic Slitter from Branson Ultrasonics Corporation, 41 Eagle Road, Danbury, Conn. has a suitable ultrasonic horn 12. The ultrasonic horn 12 emits ultrasonic energy at 40 kilohertz. The horn 12 is powered by a power supply 50 (shown in FIG. 2). A suitable power supply 50 for this application is the model 910 from Branson Ultrasonics Corporation, which has a 1,000 watt output.

Figure 5:
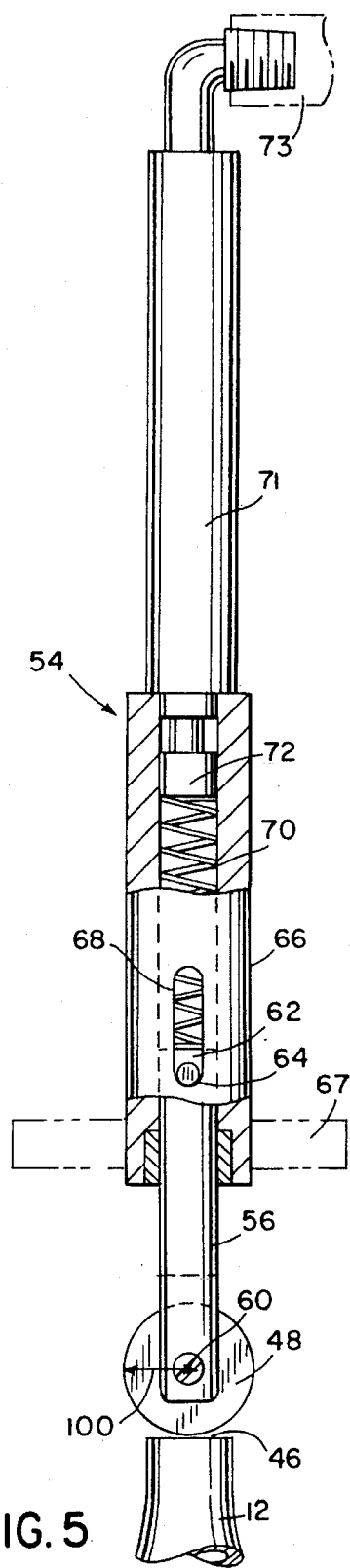
FIG. 5 is a detailed view of an air on spring disc mounting system that can be used in the present invention.

Referring to FIG. 5, the disc 48 is mounted to the frame 11 using an air on spring mount 54. The ultrasonic slitter from Branson Ultrasonics Corporation has a suitable air on spring mount 54. The air on spring mount 54 has a mounting shaft 56 that has a slot 58 (see FIG. 4) which receives the disc 48. A screw 60 fastens the disc 48 in the slot 58 of the mounting shaft 56. At an upper end 62 of the mounting shaft 56 (i.e. opposite the slot 58), a stop 64 extends from the shaft 56. The air on spring mount 54 also has a tubular spring housing 66. The spring housing 66 is attached to the frame 11 by a bracket 67. The spring housing 66 receives the upper end 62 of the mounting shaft 56. The spring housing 66 has a slot 68 that receives the stop 64 on the mounting shaft 56. A spring 70 is located within the spring housing 66 and presses down on the top of the mounting shaft 56. An air cylinder 71 is attached to the top of the spring housing 66. The air cylinder 71 can be actuated by an air source 73 to push a piston 72 downwards against the force of the spring 70.

With such an air on spring mount 54, excessive pressure between the disc 48 and the tip 46 of the ultrasonic horn 12 can be minimized. The stop 64 in the slot 68 of the spring housing 66 prevents the disc from moving downward when the stop 64 is located at the bottom of the slot 68. On the other hand, if there is some sort of disturbance in the film 14, the disc 48 can rise up against the pressure of the spring 70. The air cylinder 71 can be deactivated to ease the guiding of shrink wrap film 14 through the contact location between the disc 48 and the tip 46 of the ultrasonic horn 12 at startup of operation.

Referring again to FIG. 4, the two layers of shrink wrap 14 are guided through the contact location between the edge 81 of the disc 48 and the tip 46 of the ultrasonic horn using a film guide comprising chain drives 74, 76, 78 and 80. Note that chain 74 is located only downstream of the ultrasonic horn 12, while chain drives 76, 78 and 80 are located both upstream and downstream of the ultrasonic horn 12 (see FIG. 3). Upstream of the horn 12, the two layers of shrink wrap film 14 are fed in between chain drives 78 and 80 and on top of chain drive 76 to guide the shrink wrap film 14 in between the tip 46 of the ultrasonic horn 12 and the disc 48. Downstream of the horn 12, the layers of shrink wrap film 14 are also fed in between chain drives 74 and 76. The chain drives 74, 76, 78 and 80 operate at generally the same speed as the exit conveyor 24.

To set up the system 10, the air cylinder 71 is depressurized so film 24 can be guided through the contact location between the tip 46 of the horn 12 and the edge 81 of the disc 48, and into the chain drives 74, 76 and 80. Air from the air source 73 is then used to actuate the air cylinder 71 and push the edge 81 of the disc 48 against the tip 46 of the horn 12 (with the layers of film 14 therebetween). A small air regulator controls the amount of air in the air cylinder 71. The higher the air pressure is set, the more the spring 70 compresses which in turn puts more pressure at the contact location between the disc 48 and the tip 46 of the ultrasonic horn 12. It is preferred to operate the system with an air pressure of 20 psig. It is important that the edge 81 of the disc 48 not be pressed against the tip 46 of the horn 12 excessively, otherwise a wear spot will appear in the horn tip 46. If there is not enough pressure at the contact location between the disc 48 and the tip 46 of the ultrasonic horn 12, the system will squeal.

To operate the side sealers, the shrink wrap film 14 is pulled by the chain drives 74, 76, 78 and 80, and the layers of shrink wrap film 14 are sliced and welded together at the contact location between the edge 81 of the disc 48 and the tip 46 of the horn 12. The inside chain drives 74 and 76 pull on the overhanging position 43 of the shrink wrap film that remains around the packaged item 28 after the side seal has been cut and welded. The outside chain drives 78 and 80 pull on the waste or selvage film. The selvage film is disposed of by winding the selvage around a selvage winder 103. As noted above, the hot knife 34 used for cross sealing does not cross cut the entire width of the layers of shrink wrap film 14 so that the outside chain drive 78 and 80 can continue to pull the shrink wrap film 14.

In many circumstances, it is desirable to keep the side seal as close as possible to the item or items 28 being packaged. This can be accomplished by moving the contact location between the edge 81 of the disc 48 and the tip 46 of the horn 12 closer to the exit conveyor 24. The drawings show chain drives 74, 76, 78 and 80 being used to guide the shrink wrap film 14 through the contact location. However, other guide means such as pinch rollers before and after the contact location can be used (not shown). With pinch rollers, it may be possible to move the contact location between the edge 81 of the disc 48 and the tip 46 of the horn 12 closer to the exit conveyor 24. One set of pinch rollers can be positioned before the disc 48 and the tip 46 of the ultrasonic horn 12 to pinch the layers of film together before they pass through the contact location, and another set of pinch rollers can be positioned after the disc 48 and the tip 46 of the ultrasonic horn to pull the film 14 through the contact location. In order to have better control of the film 14 through the contact location, it may be useful to place the pinch rollers close to the horn tip 46 and the disc 48, and even carve out a portion of the rollers so the rollers can in part surround the horn tip 46 and the disc 48.

Figures 6, 7:
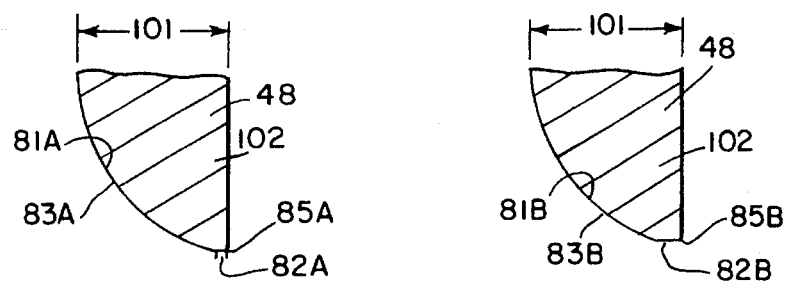
FIG. 6 is a partial cross sectional view of a disc as it is used in accordance with the present invention.
FIG. 7 is a view similar to FIG. 6 showing an alternative embodiment of a disc in accordance with the present invention.

It is preferred that the shape of the edge 81 of the disc 48 be different than the disc that is supplied with the model F10 Ultrasonic Slitter from Branson. Referring to FIGS. 6 and 7, the preferred disc 48 has a ½ inch radius and a ⅛ inch width 101. It is preferred that the disc edge 81 have a radius of 0.125 inch, and also a flat portion 82 of about 0.010 inch at a cutting side 102 of the disc edge 81. However, the edge 81a and 81b of the disc 48 should be shaped slightly different depending on the type of shrink wrap film 14 being used. In general, a disc 48 with the shape shown in FIG. 6 should be used for polyvinyl chloride and polypropylene films 14, whereas a disc shaped more like that shown in FIG. 7 should be used for polyolefin films 14. The edge 81a and 81b of the disc 48 has a small flat portion 82a and 82b and a radius portion 83a and 83b. It is believed that the welding of the films 14 occurs in the flat portions 82a and 82b. The radius portions 83a and 83b taper the weld so the weld holds together on that side of the disc 48. It is believed that the cutting or slitting of the film 14 occurs at the sharp edge 85a and 85b on the cutting side 102 of the disc 48. Ultrasonic energy from the tip 46 of the horn 12 bounces off the disc edge 81a and 81b and creates heat in the two layers of film 14 between the disc edge 81 and the horn tip 46. It is believed that the heat and pressure in the radius portion 83A and 83B are gradually less intense, and this facilitates the weld. On the cutting side 102 of the disc 48, the intensity does not lessen gradually and thus the film is slit. The flat portion 82B in FIG. 7 is larger than the flat portion 82A in FIG. 6 because polyolefin films need more heat to weld. It is preferred that the length of the flat portion 82B in FIG. 7 (i.e. polyolefin films) be greater than 0.010 inches and less than 0.035 inches.

Referring to FIG. 5, the disc 48 can be rotated around screw 60 when a fresh edge 81a or 81b is needed. It is also important that the disc 48 be properly aligned in the direction that the film 14 is being pulled (i.e. the direction of arrows 18). The bracket 67 shown in FIG. 5 should allow the disc 48 to be rotated along the vertical axis of the mounting bracket 54 to allow proper alignment.

It is important to turn off the ultrasonic horn 12 after the exit conveyor 24 has been stopped to prevent over welding. A delay of about 0.5 second may be useful to compensate for coasting of the exit conveyor 24. Turning off the ultrasonic horn 12 prolongs the life of the disc 48 and the horn tip 46.

In order to facilitate proper welding of the layers of shrink wrap film 14 it is important that the speed of the film through the contact location between the disc 48 and the tip 46 of the horn 12 be properly tailored to the particular shrink wrap film being used, and the rate of ultrasonic energy from the ultrasonic horn 12. Using a 40 kilohertz ultrasonic horn, it is preferably to run polyvinyl chloride and polyvinyl ethylene films at 40–105 feet per minute. It is preferably to run polyolefin films under the same circumstances at 50–70 feet per minute.

A variable speed system is therefore useful for optimizing welding effectiveness, especially when different types of film 14 are intended to be used. A variable speed system in accordance with the present invention is shown in FIG. 8.

Figure 8:
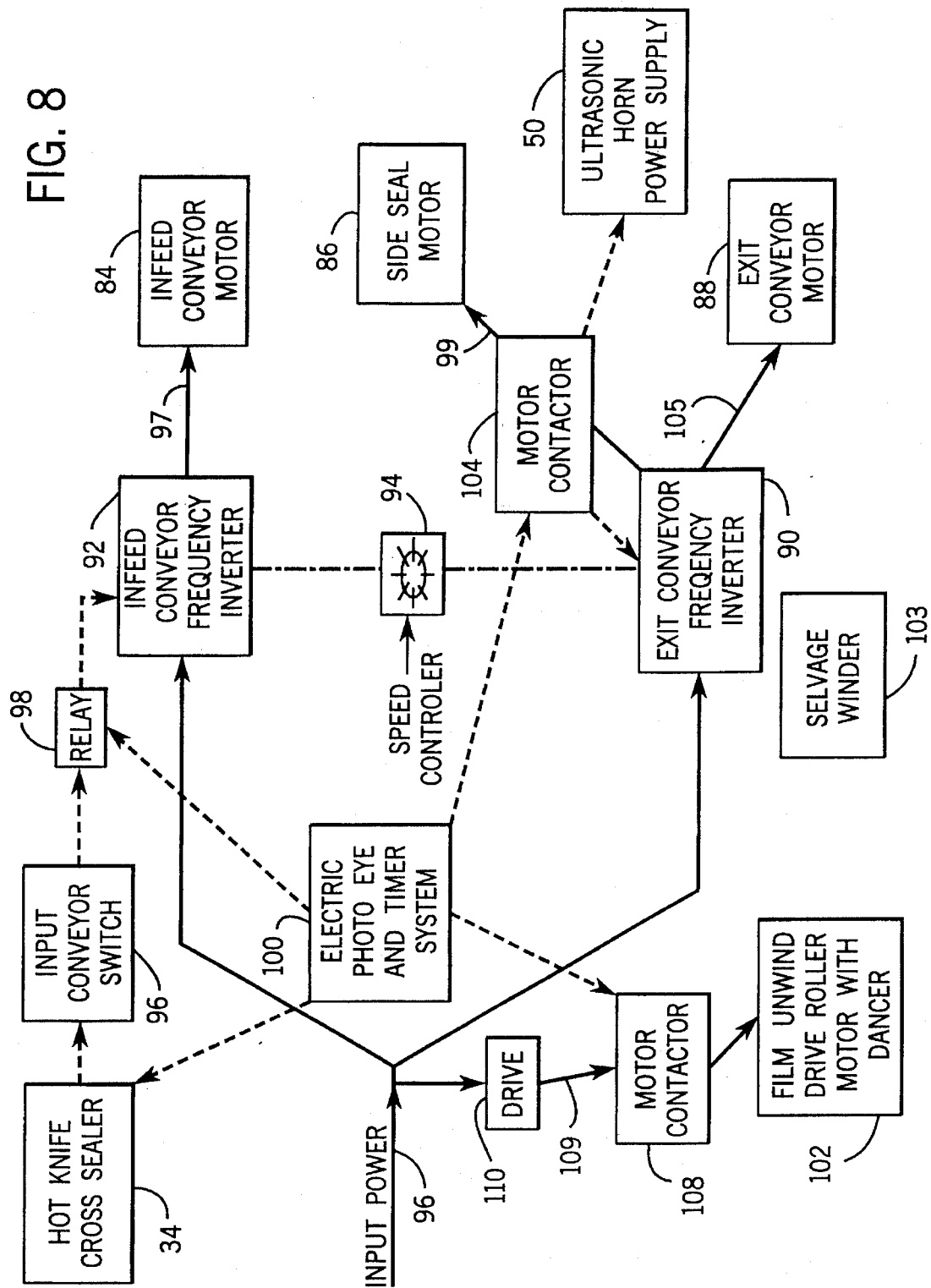
FIG. 8 is a schematic view showing a speed control system in accordance with the present invention.

Referring to FIG. 8, the preferred system 10 has three induction motors 84, 86 and 88. Induction motor 84 drives the infeed conveyor 16. Induction motor 88 drives the exit conveyor 24. Induction motor 86 drives the chain drive 22. Motors 86 and 88 receive three phase, frequency adjusted power from an exit conveyor frequency inverter 90. The infeed conveyor motor 84 receives three phase, frequency adjusted power from a separate frequency inverter 92.

A single speed controller 94 (i.e. a 5K ohm potentiometer) is connected to both frequency inverter 90 and frequency inverter 92 so that the motors 84, 86 and 88 all operate at the same speed.

Input electrical power (e.g. single phase) is supplied to the system in line 96 and is transmitted to the infeed conveyor frequency inverter 92 and the exit conveyor frequency inverter 90. A film feed control circuit (shown as dashed lines in FIG. 8) coordinates the starting and stopping of the motors 84, 86 and 88, the cross sealer 34, the ultrasonic horn 12, and the film unwinder 102. When the jaw of the hot knife cross sealer 34 opens, an input conveyor switch 96 is activated and sends a signal to relay 98. The infeed conveyor frequency inverter 92 receives a signal from the relay 98 and in turn transmits three phase frequency adjusted power through line 97 to the infeed conveyor motor 84 to start the infeed conveyor 16 moving in the forward direction. As the group of one or more items being packaged 28 moves in the forward direction, an electric photo eye 100 detects the item 28, and sends a signal to a motor contactor 104 located in a line 99 between the exit conveyor frequency inverter 90 and the side seal motor 86. The motor contactor 104 sends a signal to the exit conveyor frequency inverter 90, and also closes the electrical path in line 99. After receiving the signal from the motor contactor 104, the exit conveyor frequency inverter 90 transmits three phase frequency adjusted power to the side seal motor 86 through line 99, and to the exit conveyor motor 88 through line 105. At the same time, the motor contactor 104 also sends a signal to turn on the power supply 50 for the ultrasonic horn 12. Also at the same time, the electric photo eye system 100 sends a signal to another motor contactor 108 that is located in line 109 to the film unwind drive roller motor 102. The signal from the electric photo eye system 100 closes the motor contactor 108 so power from line 96 can be transmitted through drive 110 to the film unwind motor 102.

When the item or items being packaged 28 clear the photo eye path, the electric photo eye 100 sends a signal, after a short delay to account for the necessary film overhang, to relay 98 to stop the infeed conveyor motor 84. A delayed signal is also sent to motor contactor 108 to turn off the film unwind motor 102, and to the motor contactor 104 to stop the side seal motor 86, the exit conveyor motor 88, and to turn off the ultrasonic horn 12. Also at the same time, the electric photo eye sends a delayed signal to the hot knife cross sealer 34, and the hot knife 34 jaw stacks moving down to press against the seal pad 36 to form the cross seal. The signals from the photo eye 100 are delayed in a timer circuit which is part of the photo eye system 100. When the hot knife cross sealer 38 opens, it activates switch 96 and the cycle repeats.

The exit conveyor motor 88 is stopped by the dynamic brake function of the exit conveyor frequency inverter 90. Likewise, the infeed conveyor motor 84 is stopped by the dynamic brake function of the infeed conveyor frequency inverter 92. It is preferred that the side seal motor 86 be equipped with an electrical mechanical brake (not shown). This is important so that the chain drive can stop immediately when the side seal motor 86 is de-energized. This is useful for keeping the film 14 under control. Since the side seal motor 86 has an electromechanical brake, motor contactor 104 is necessary to prevent dynamic braking feedback into the inverter 90 upon startup of the side seal motor 86.

The frequency inverters 92 and 90 are useful to allow the conveyors 16 and 24 to be ramped-up gradually which is important when packaging unstable packages such as stacks of paper. Frequency inverters such as those supplied by Baldor, Fort Smith, Ark. (Serial 11 inverter drive) are suitable for the present invention.

The film unwinder 102 can have a dancer (not shown) as is known in the art to keep the film 14 from unwinding too slow and being fed too slowly into the contact location between the edge 81 of the disc 48 and the tip 46 of the horn 12 when the film roll becomes smaller. The speed of the film 14 should match the speed of the conveyors 16.

The selvage film winder 103 can be a constant torque motor that trips when the conveyors stop due to torque from the film. The selvage film winder 104 can have an adjustable voltage motor to control how hard the selvage motor pulls, in order to keep the waste film from breaking.

It is recognized that various equivalents, alternatives and modifications are possible and should be considered to be within the scope of the claims.

I claim:

1. A method of sealing shrink wrap film around a group of one or more items, the method comprising the steps of:

putting a group of one or more items in between two layers of shrink wrap film in such a manner that an overhanging portion of each layer of film extends beyond a designated side of the group of one or more items;

moving the layers of film and the group of one or more items located therein contemporaneously in a forward direction;

providing a side sealer having an ultrasonic horn having a tip from which ultrasonic energy can be transmitted and a disc having an edge;

slitting and sealing together the layers of the film to form a side seal in the overhanging portion of each layer of film by:

passing the layers of film between the tip of the horn and the edge of the disc at a contact location therebetween;

squeezing together the layers of film in the overhanging portion of each layer of film at the contact location as the layers of film and the group of one or more items therein move in a forward direction, and applying ultrasonic energy at the contact location when the layers of film are being squeezed together to form a side seal;

wherein the edge of the disc has a flat portion on the side away from the group of one or more items being wrapped and a curved portion on the side toward the group of one or more items being wrapped, the curved portion tapering away from the tip of the ultrasonic horn as the curved portion extends away from the flat portion, and the layers of film are squeezed together in such a manner that the layers of film are squeezed together more tightly by the flat portion of the disc edge and less tightly by the curved portion of the disc edge.

2. A method as recited in claim 1 wherein the speed of movement of the layers of film in the forward direction depends on the rate at which ultrasonic energy is being applied and the weldability characteristics of the shrink wrap film.

3. A method as recited in claim 1 wherein the layers of shrink wrap film are polyvinyl chloride, the layers of film and the group of one or more items located therein are moved in the forward direction at a speed of 40 to 105 feet per minute, and ultrasonic energy is applied at a frequency of about 40 kilohertz.

4. A method as recited in claim 1 wherein the layers of shrink wrap of film are made of one or more polyolefins, the layers of film and the group of one or more items located therein are moved in a forward direction at a speed of 45 to 85 feet per minute, and ultrasonic energy is applied at a frequency of about 40 kilohertz.

5. A method as recited in claim 1 further comprising the step of cross-slitting and cross-sealing the layers of the shrink wrap of film to form a cross seal behind the group of one or more items.

6. A method as recited in claim 5 wherein the cross seal is formed after the group of one or more items has moved beyond the contact location.

7. A method as recited in claim 5 wherein:

forward movement of the layers of shrink wrap film and the group of one or more items therein is stopped after the group of one or more items moves beyond the contact location and before cross-slitting and cross-sealing the layers of film; and cross-slitting and cross-sealing of the layers of film to form a cross seal occurs when the forward movement of the film has been stopped.

8. A method as recited in claim 7 further comprising the step of discontinuing the application of ultrasonic energy shortly after the forward movement of the shrink wrap film and the group of one or more items therein is stopped.

9. A shrink wrap packaging system comprising:

a shrink wrap film holder;

a shrink wrap film unwinder that unwinds two layers of shrink wrap film from the shrink wrap film holder and can move the layers of film in a forward direction;

an infeed conveyor for moving a group of one or more items in the forward direction and in between the layers of shrink wrap film in such a manner that an overhanging portion of each layer extends sideward beyond the group of one or more items; and a side sealer that slits the two layers of shrink wrap film in the overhanging portion and seals together the two layers of shrink wrap film where the two layers are slit, the side sealer having an ultrasonic horn having a tip from which ultrasonic energy can be transmitted, and a disk having an edge;

wherein the overhanging portion of the two layers of shrink wrap film can be moved between the edge of the disc and the tip of the ultrasonic horn in such a manner that the two layers of the film can be squeezed together between the edge of the disc and the tip of the ultrasonic horn and ultrasonic energy can be applied to the layers of film when the layers of film are being squeezed together; and one or more items; and wherein the edge of the disc has a flat portion on the side away from the group of one or more items being wrapped and an upwardly curved portion on the side toward the group of one or more items being wrapped, and the upwardly curved portion tapers away from the tip of the ultrasonic horn as the upwardly curved portion extends away from the flat portion.

10. A system as recited in claim 9 further comprising a cross sealer for cross slitting and cross sealing the two layers of shrink wrap film to form a cross seal.

11. A system as recited in claim 9 wherein the two layers of shrink wrap film are center-folded shrink wrap film.

12. A system as recited in claim 10 further comprising an exit conveyor located downstream of the infeed conveyor which can continue to move the group of one or more items in the forward direction, wherein the group of one or more items are transferred from the infeed conveyor to the exit conveyor before cross sealing the two layers of shrink wrap film.

13. A system as recited in claim 12 wherein the cross sealer is a jaw-type hot knife cross sealer and the exit conveyor can be stopped when a group of one or more items moves beyond the cross sealer so that the jaw-type hot knife cross sealer can cross seal the layers of film when the layers are not moving in the forward directions.

14. A system as recited in claim 13 further comprising an electric photo eye that detects when a group of one or more items has cleared the photo eye and creates an associated signal to stop the exit conveyor.

15. A system as recited in claim 14 further comprising a timer circuit that receives the signal from the electric photo eye and sends a delayed signal to stop the exit conveyor.

16. A shrink wrap packaging system comprising:
a shrink wrap film holder;
a shrink wrap film unwinder that unwinds two layers of shrink wrap film from the shrink wrap film holder and can move the layers of film in a forward direction;
an infeed conveyor for moving a group of one or more items in the forward direction and in between the layers of shrink wrap film in such a manner that an overhanging portion of each layer extends sideward beyond the group of one or more items; and
a side sealer that slits the two layers of shrink wrap film in the overhanging portion and seals together the two layers of shrink wrap film where the two layers are slit, the side sealer having
an ultrasonic horn having a tip from which ultrasonic energy can be transmitted, and
a disk having an edge;
wherein the overhanging portion of the two layers of shrink wrap film can be moved between the edge of the disc and the tip of the ultrasonic horn in such a manner that the two layers of the film can be squeezed together between the edge of the disc and the tip of the ultrasonic horn and ultrasonic energy can be applied to the layers of film when the layers of film are being squeezed together; and
a shrink wrap film guide that guides the shrink wrap film in between the edge of the disc and the tip of the ultrasonic horn, wherein the shrink wrap film guide also pulls the layers of shrink wrap film in the forward direction by pulling on a selvage portion of the overhanging portion of the layers of shrink wrap film at a location downstream of the side sealer and in a direction that is parallel to the forward direction in which the group of one or more items move through the system.

17. A system as recited in claim 9 wherein the disc is circular.

18. A system as recited in claim 17 wherein the circular disc can be rotated to expose a fresh edge to the tip of the ultrasonic horn.

19. A system as recited in claim 10 wherein the upwardly curved portion of the edge of the disc has a radius of about 0.125 inches.

20. A system as recited in claim 19 wherein the flat portion of the edge of the disc is about 0.010 inches.

21. A system as recited in claim 19 wherein the flat portion of the edge of the disc is greater than 0.010 inches and less than 0.035 inches.

22. A system as recited in claim 10 further comprising an air on spring disc mount for mounting the disc opposite the tip of the ultrasonic horn.

23. A system as recited in claim 22 wherein the height of a contact location between the edge of the disc and the tip of the ultrasonic horn, and the distance between the group of one or more items being wrapped and the contact location between the edge of the disc and the tip of the ultrasonic horn can be adjusted.

24. A shrink wrap packaging system comprising:
a shrink wrap film holder;
a shrink wrap film unwinder that unwinds two layers of shrink wrap film from the shrink wrap film holder and can move the layers of film in a forward direction;
an infeed conveyor for moving a group of one or more items in the forward direction and in between the layers of shrink wrap film in such a manner that an overhanging portion of each layer extends sideward beyond the group of one or more items;
a side sealer that slits the two layers of shrink wrap film in the overhanging portion and seals together the two layers of shrink wrap film where the two layers are slit, the side sealer having
an ultrasonic horn having a tip from which ultrasonic energy can be transmitted, and
a disk having an edge;
wherein the overhanging portion of the two layers of shrink wrap film can be moved between the edge of the disc and the tip of the ultrasonic horn in such a manner that the two layers of the film can be squeezed together between the edge of the disc and the tip of the ultrasonic horn and ultrasonic energy can be applied to the layers of film when the layers of film are being squeezed together;
a shrink wrap film guide that guides the shrink wrap film in between the edge of the disc and the tip of the ultrasonic horn;
a cross sealer for cross slitting and cross sealing the two layers of shrink wrap film to form a cross seal;
an exit conveyor located downstream of the infeed conveyor which can continue to move the group of one or more items in the forward direction, wherein the group of one or more items are transferred from the infeed conveyor to the exit conveyor before cross sealing the two layers of shrink wrap film; and
an infeed conveyor motor for driving the infeed conveyor, a first frequency inverter for controlling the speed of the infeed conveyor, an exit motor for driving the exit conveyor, a side seal motor for driving the side sealer, and a second frequency inverter for controlling the speed of the exit conveyor and the speed of the film through the film guide,
wherein the speed of the infeed conveyor is controlled by the first frequency inverter driving the infeed conveyor motor, the speed of the exit conveyor is controlled by the second frequency inverter driving the exit motor, and the speed of the film through the film guide is controlled by the second frequency inverter driving the side seal motor.

25. A system as recited in claim 24 wherein the first and second frequency inverters are adjusted by the same speed controller.

* * * * *

UNITED STATES PATENT AND TRADEMARK OFFICE
CERTIFICATE OF CORRECTION

PATENT NO. : 5,519,983
DATED : May 28, 1996
INVENTOR(S) : Ricky E. Moen

It is certified that error appears in the above-indentified patent and that said Letters Patent is hereby corrected as shown below:

CLAIM 9, Col. 10, Line 49, after "; and", delete "one or more items; and".

Signed and Sealed this

Tenth Day of September, 1996

BRUCE LEHMAN

Attest:

Attesting Officer

Commissioner of Patents and Trademarks